May 20, 1930.  C. H. NORRLIN  1,759,801
FLUID CONTROLLED TRANSMISSION MECHANISM
Filed Nov. 10, 1927   4 Sheets-Sheet 1
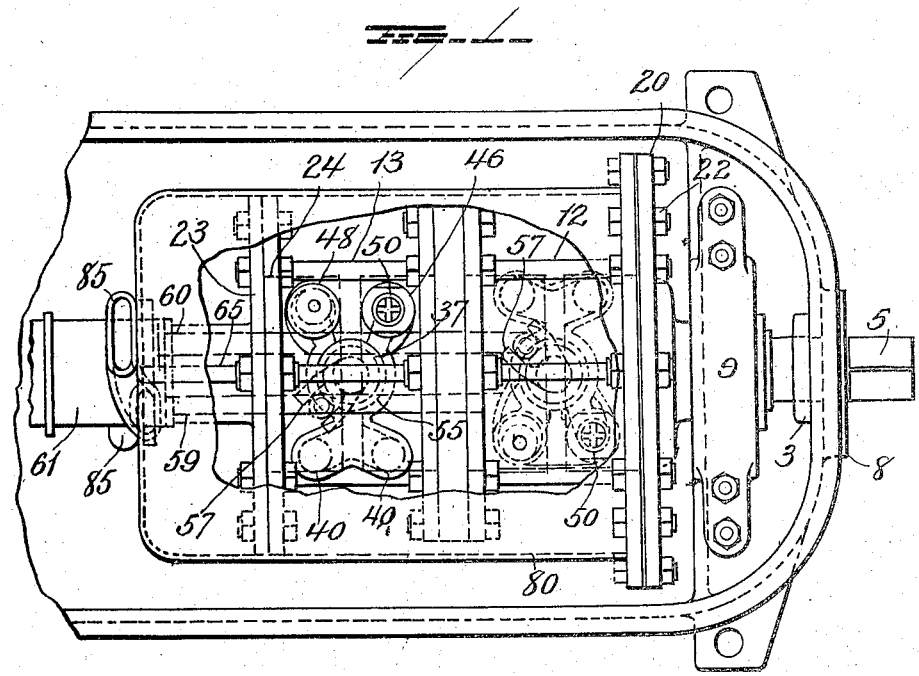
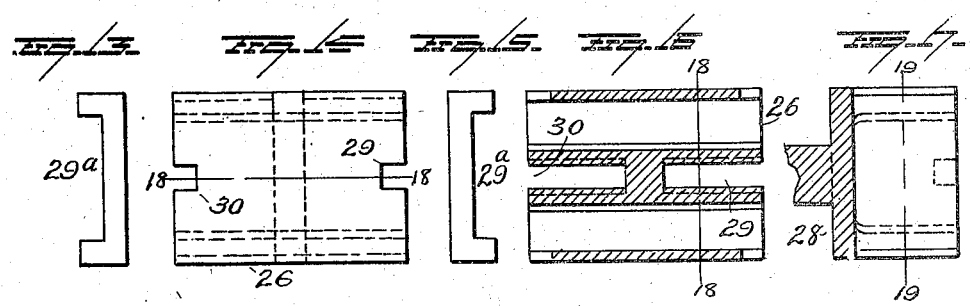
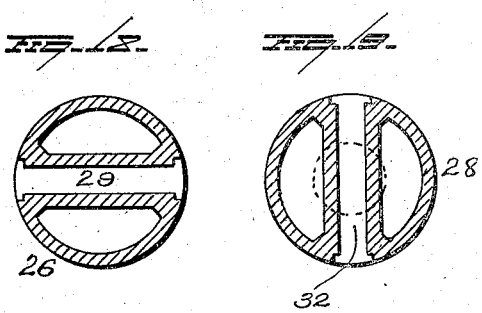
Inventor
C. H. Norrlin
By Seymour Bright
Attorneys

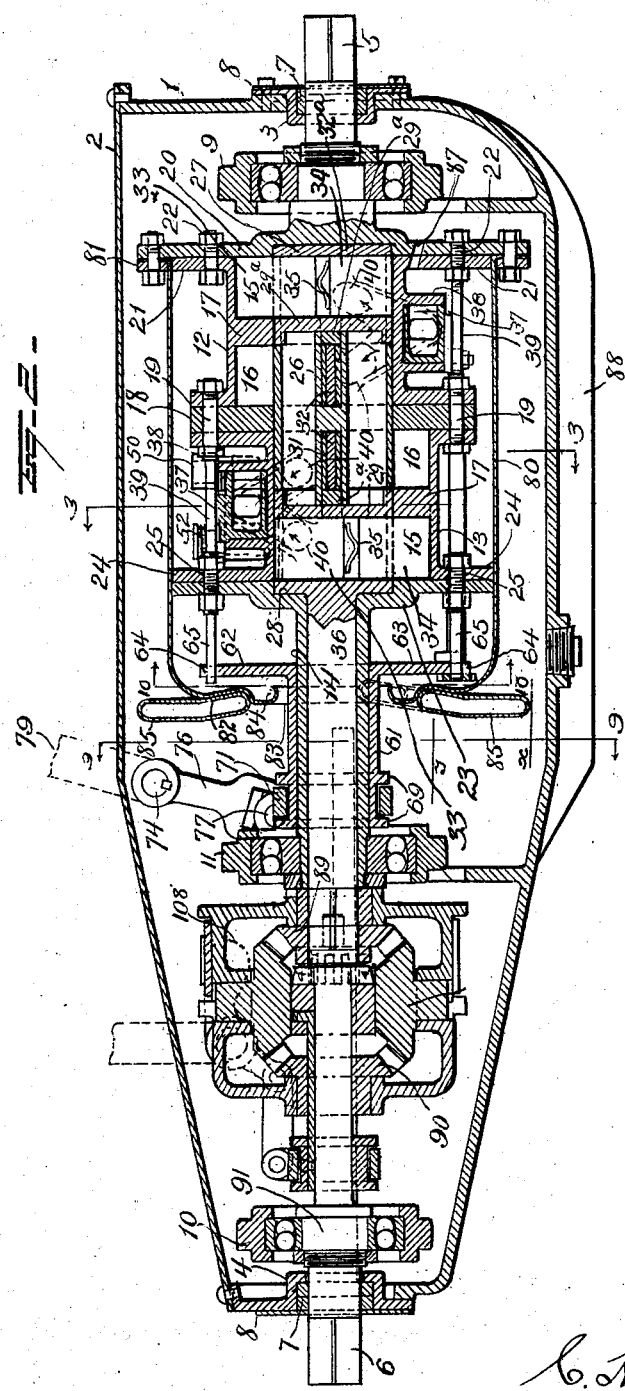

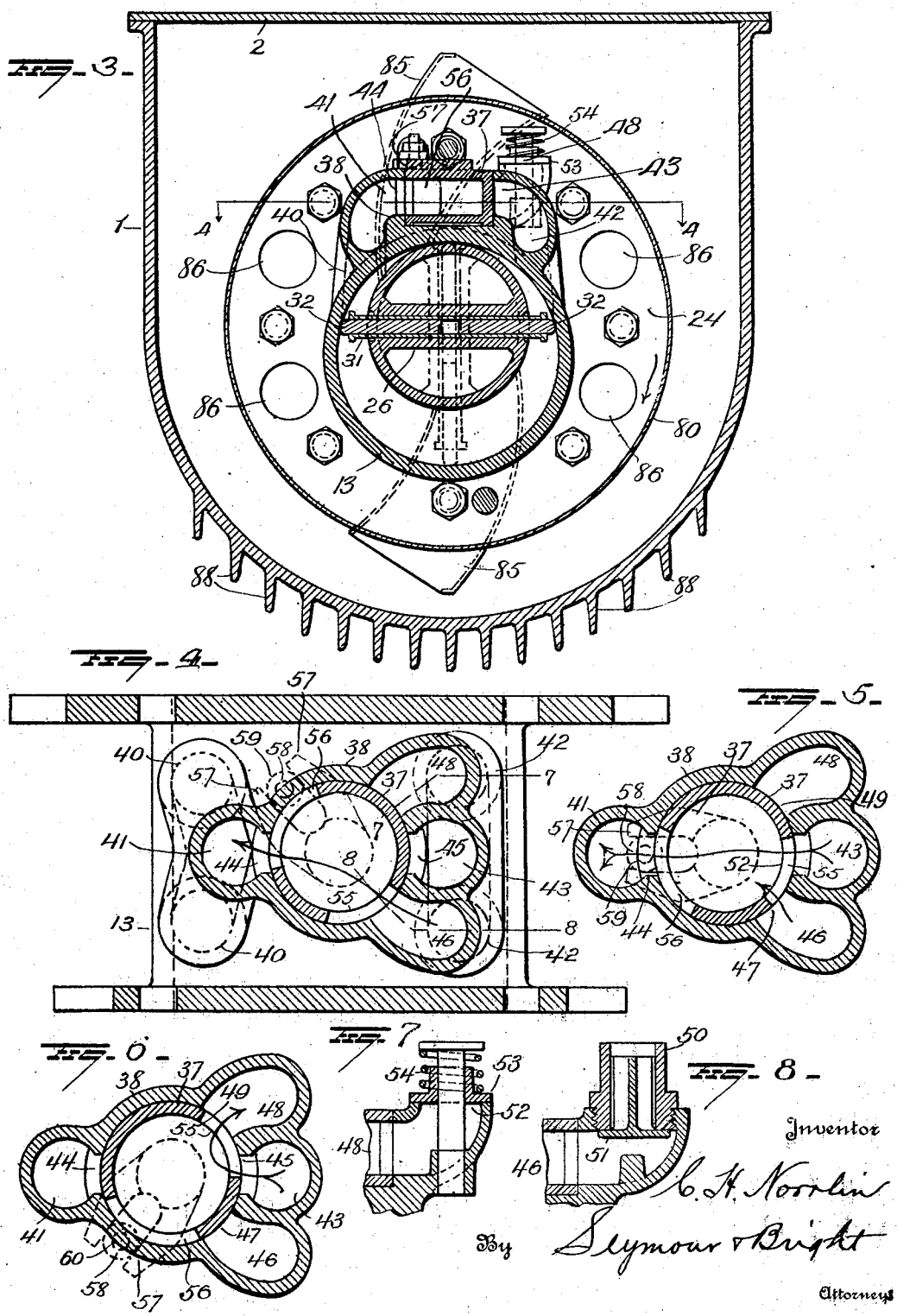

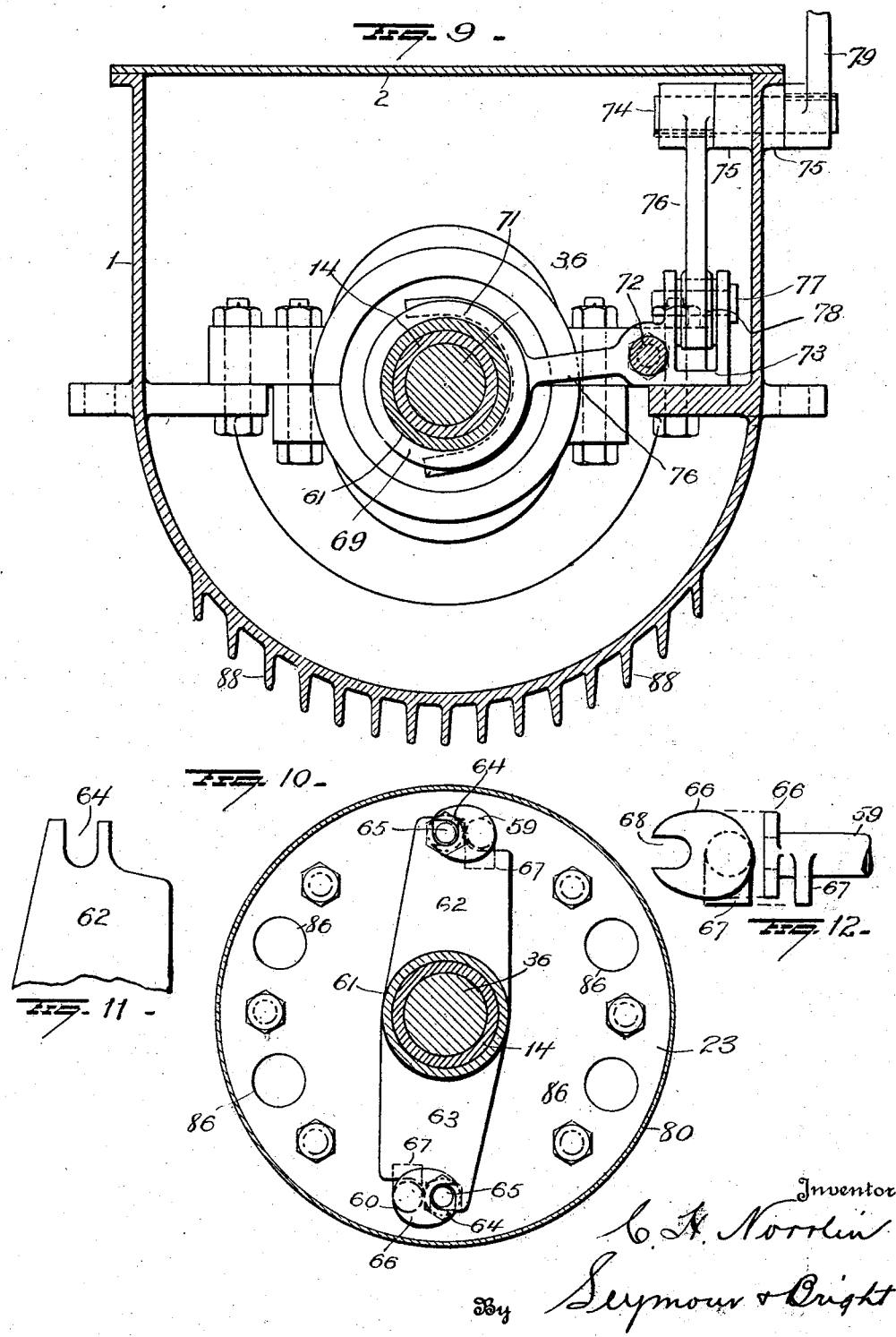

Patented May 20, 1930

1,759,801

UNITED STATES PATENT OFFICE

CHARLES H. NORRLIN, OF PHILADELPHIA, PENNSYLVANIA

FLUID-CONTROLLED TRANSMISSION MECHANISM

Application filed November 10, 1927. Serial No. 232,453.

This invention relates to improvements in fluid controlled transmission mechanism,— one object of the invention being to provide simple and efficient fluid controlled means which shall be operable effectually to control the transmission of power from a driving to a driven shaft and to control the speed of the latter with relation to the former.

A further object is to provide hydraulic controlled transmission mechanism in which eccentrically mounted cylinders revolve with rotors and pistons in the same direction, and in which simple means shall be provided for controlling the fluid velocity so as to cause greater or less difference in relative speed between the driving and driven shafts.

A further object is to so construct the mechanism that the same shall be kept in balance and distribution of uniform torque to the driven shaft be insured.

A further object is to construct the mechanism in such manner that the working fluid shall be held in suspension within a chamber containing cylinder, rotor and piston mechanism and by centrifugal action deliver a certain amount of pressure and also cause the liquid (preferably oil) to surround the valve and working parts and thus prevent air from being mixed with the oil during operation of the mechanism.

With these and other objects in view, the invention consists in certain novel features of construction and combinations of parts as hereinafter set forth and pointed out in the claims.

In the accompanying drawings:—

Figure 1 is a plan view, and the cover of the outer casing removed and a portion of the inner casing broken away;
Figure 2 is a longitudinal sectional view;

Figure 3 is a transverse sectional view on the line 3—3 of Figure 2;

Figure 4 is a view in section of the line 4—4 of Figure 3;
Figures 5 and 6 are sectional views showing different positions on one of the valves 37;

Figure 7 is a view in section on the line 7—7 of Figure 4;

Figure 8 is a view in section on the line 8—8 of Figure 4;

Figure 9 is a transverse sectional view on the line 9—9 of Figure 2;

Figure 10 is a view in section on the line 10—10 of Figure 2;

Figure 11 is a view of a portion of an arm which forms a part of the valve-controlling mechanism;

Figure 12 shows details of a portion of the valve operating devices;

Figure 14 is a view in elevation of the rotor 26;

Figures 13 and 15 are views of keys for uniting the rotors;

Figure 16 is a sectional view of the rotor 26;

Figure 17 is a sectional view of the rotor 28;

Figure 18 is a view in section on the line 18—18 of Figure 16; and

Figure 19 is a view in section on the line 19—19 of Figure 17.

A main or outer casing is indicated at 1 and is provided with a cover plate 2, so that the mechanism within said casing will be completely enclosed except for the projecting portions of the driving and driven shafts and the control levers.

Caps 3 and 4 are secured to respective ends of the casing 1 and these caps are adapted for the passage of driving and driven shafts 5, 6 respectively and carry bushings 7 for said shafts, said bushings being held in place by cover plates 8. Ball bearing devices 9, 10 for the respective shafts 5, 6 are suitably supported by and secured to the casing 1 within the same near respective ends thereof, and intermediate ball bearing devices are indicated at 11 for supporting parts of the mechanism, as hereinafter more particularly described.

Located within the casing 1 are two cylinders 12 and 13,—one of which is eccentric to the driving shaft 5 and the other of which is eccentric to a tubular shaft 14 mounted in the ball bearing devices 11. The cylinders 12, 13 are divided each into two chambers 15, 16 by a partition 17 and between the two cylinders, a partition 18 is disposed and secured to flanges of said cylinders by bolts 19,—said partition 18 serving as inner end walls for the chambers 16 of the respective cylinders. A disk 20 made rigid with the driving shaft

5 constitutes one end wall for the chamber 15 of cylinder 12 and is secured to a flange 21 of the latter by means of bolts 22. A disk 23 made rigid with the tubular shaft 14 constitutes a wall of the chamber 15 of cylinder 13 and is secured to a flange 24 thereof by means of bolts 25.

Within the cylinders, rotors 26, 27 and 28 are located and so positioned that they will be concentric with the axis of the shaft 5. The rotor 26 is located between the rotors 27 and 28 and the three rotors are coupled together by means of keys 29$^a$. By making the rotors as separate parts or units, coupled together, machining of the same is facilitated. The central rotor occupies the chambers 16, 16 of the respective cylinders 12 and 13 while the rotors 27 and 28 occupy the chambers 15 of the respective cylinders. The intermediate rotor 26 enters the chambers 16 of both cylinders 12 and 13 and is constructed with guide ways 29—30 in the respective cylinders for the accommodation of guides 31 for pairs of sliding pistons 32. Each of the rotors 27 28 is made with guide-ways 32$^a$ (arranged at any suitable angle, preferably at right angles to the guide-ways of the rotor 26) for the accommodation of guides such as shown at 31, Figure 2, carrying pairs of pistons 33 and 34. The pistons of each pair are separated by a spring 35 which maintains outward pressure thereon to cause them to maintain engagement with the cylinder walls, and as the cylinders are eccentrically mounted with respect to the rotors, a sliding action of the pistons will occur relatively to the rotor which provide side supporting means for the pistons and prevent tilting of the projected piston under unequal pressure so that there may be a greater difference between the rotor and cylinder diameters than was practical in prior arrangements. The guides have some movement with the pistons so that there is a minimum frictional resistance per unit of pressure on the pistons within the rotors, permitting free movement without a tendency to bind.

The rotor 28 is made rigid with a driven shaft section 36 mounted in and passing through the tubular shaft 14 and means are provided for operatively connecting said driven shaft section 36 with the driven shaft 6. As the several rotors are connected together and made rigid with the driven shaft section 36, all torque of the pistons will be transmitted to said driven shaft section.

Hollow distributing valves 37 are provided for the cylinders 12, 13 and are seated in suitable valve casings 38 on the respective cylinders and held from displacement by bolts 39 which may be extensions of the bolts which secure the cylinders together. The chambers 15 and 16 of each cylinder are connected by inlet ducts 40, 40, with a common chamber 41 in the valve casing 38 and discharge ducts 42, 42, (Fig. 4) communicate with a common chamber 43 in the valve casing opposite the chamber 41,—the valve 37 being located between said chambers 41 and 43 and controlling the ports 44 and 45 thereof. Each valve casing 38 is provided with an inlet passage 46, the port 47 of which is controlled by the valve 37, and said casing is also provided with a discharge passage 48 the port 49 of which is controlled by said valve 37. An open inlet nipple 50 (Fig. 8) communicates with each inlet passage 46 and this nipple and hence the passage 46 is provided with an inwardly-opening check valve 51. The outer port 52 of each discharge passage 48 is closed by an outwardly-opening valve 53 (Fig. 7) normally held to its seat by a spring 54. It will be seen by reference to Fig. 3 that the inlet passages 40 communicates with the cylinders at one side of the rotors and that the discharge ports communicate with said cylinders at the opposite side of the rotors. Each valve 37 is provided with ports 55 and 56 and is adapted to control the passage of fluid to and from the cylinders. For operating these valves 37, the devices now to be described may be employed: The rotary valves 37 are provided with bifurcated arms 57 which receive rollers 58 carried by rods 59, 60. A sleeve 61 on the tubular shaft 14 is provided with arms 62, 63 having notches 64 for the accommodation of guide studs or rods 65, and the rods 59, 60 are provided with enlargements 66, 67 which constitute means for coupling said rods to the arms 62, 63, and the enlargements 66 are bifurcated, as at 68, to engage the guide rods or studs 65. The sleeve 61 is provided with spaced annular flanges 69 forming an annular groove receiving a shifting fork 71, the arm of which is adapted to slide on a fixed stud or guide 72, and the arm of said shifting fork is provided with a slotted head 73. A pin 74 is mounted in one of the side walls of the main casing 1 near the top thereof (suitable bearings 75 being provided for said pin) and to the inner end portion of said pin, a forked arm 76 is secured. A pin 77 extends across the slot of the head 73 and a block 78 is mounted on said pin and is received by the forked end of the arm 76. To the outer end of the pin 74 (exteriorly of the casing 1) a hand lever 79 is secured. It is apparent that when the hand lever 79 is operated, motion will be imparted, through the connections above described, to the sleeve 61 and arms 62—63 and by said arms through the rods 59, 60 to the slotted arms 57 on the rotary valves 37 for operating the valves.

The cylinders 12 and 13 and the mechanism associated therewith, including the valve devices hereinbefore described, are enclosed by an inner casing 80, one end of which is secured to the disk 20 by means of a ring 81 bolted to said disk near the periphery thereof. The other end of the inner casing 80 extends inwardly as at 82 and is formed with a central opening 83 surrounded by a flange 84. Welded or otherwise secured to the end portion 82 of the inner casing, are hollow vanes 85, which are so formed and proportioned that they will dip oil from the bottom portion of the main or outer casing 1, and convey such oil into the inner casing, during the rotation of the latter and the mechanism contained therein. Holes 86 are provided in the disk 23 and flange 24, to form circulating passages for oil within the casing 80, and holes 87 (Fig. 2) are provided in the disk 20 and flange 21 to form outlets for oil from the chamber within the casing 80.

In order to dissipate the heat units which may develop in the working mechanism, the main casing is provided with ribs 88.

A portion of the shaft 36 is made angular and carries the bevel gear 89. The driven shaft section 6 is also made angular in cross section and carries a bevel gear 90, said shaft 6 being provided with bearing means 91 for cooperation with the ball bearing devices. Said gears 89 and 90 form parts of a differential gearing, and, in actual practice clutch devices and shifting elements are provided whereby the direction of rotation of the driven shaft relative to the driving shaft may be regulated.

The mode of operation of my improved hydraulic transmission mechanism will now be explained.

Liquid, preferably oil, is passed into the outside casing 1 to the upper oil level indicated at $y$,—the oil level when the mechanism is in operation, being indicated at $x$. Power is applied to the driving shaft 5 and the unit comprising the inner casing and the mechanism contained therein and the vanes 85, is caused to revolve. As this unit rotates in the direction of the arrow (Fig. 3), the hollow vanes 85 will pick up the oil from the main or outer casing 1 and deliver the same inside the inner casing 80. The centrifugal action due to the revolving of the casing 80 will hold this oil in suspension and cause it to cover the inside of said casing with a uniform thickness of oil. The amount of oil held in the main or outer casing 1 is graduated so that it does not exceed the capacity of the casing 80 when oil would run out at the central opening 83 while the unit is revolving. It will be understood that the outside of the cylinders 12, 13 and the attached valve devices are always and in all positions submerged in oil and subject to certain amounts of pressure due to centrifugal force, thus preventing the mixing of air and formation of air pockets. The valves 37 will be gradually moved by manipulation of the lever 79 to a position approximately such as shown in Fig. 5 when oil, entering past the inlet valves 51, will pass through the hollow valves 37 and flow to the chambers of the cylinders 12, 13. The driven shaft 36 with the attached rotors and pistons will offer resistance and gradually come into motion, revolving in the same direction as that of the driving shaft 5. When the chambers of the cylinders become filled with oil, the check valves 51 will prevent back flow of oil. During the rotation of the cylinders, a transfer of oil from the suction side to the discharge side of the pistons will occur and power is transmitted from the driving to the driven shaft. The relative speed between the driving and driven shafts is regulated and controlled by resistance offered to the flow of oil through the discharge ports, and such resistance is governed by the positions of the valves 37. When a valve 37 is positioned as indicated in Fig. 4, said valve will be closed against discharge ports and hydraulic lock will occur, so that the driving and driven shafts will run at the same speed. When it is desired to keep the driving shaft running and the driven shaft at rest, this may be accomplished by setting the valves 37 in the position indicated in Fig. 6, when communication will be established between the discharge ports and outlet valve 52. All other ports are closed and oil will be quickly exhausted from the cylinder chambers, thus eliminating all hydraulic resistance.

As previously explained, each cylinder (12—13) has two chambers with pistons set at an angle with respect to each other, and the suction and discharge ports are combined and cross-connected by means of valves 37. This cross connection is employed in order to obtain a relatively uniform displacement volume of connected cylinders so that efficiency is not impaired in the transmission of motion and loss of power is obviated. Each piston will discharge part of its displacement under pressure to the suction side of its own cylinder or adjacent cylinder depending upon the position of the pistons in relation to the port openings. Upon reference to Figs. 1 to 6, it will be understood that one inlet port 40 opens into a chamber 15 while the companion port 40 opens into the adjacent chamber 16 and a transverse passage connects them with a common central chamber 41 in the valve casing 38. Likewise, the companion outlet ports lead from companion chambers 15, 16, through a transverse passage to a common central chamber 43, and the valve 37 controls the flow between the suction and discharge ports. When the valve 37 is set as in Fig. 4, its ports establish direct communication between the main suction port 46 and the chamber 41 to the ports 40 so that the cylinders will be rapidly filled, the chamber 43 and the passage 48 being closed. When set as in Fig. 5 there will be a slow filling of the cylinders as the main inlet port is partly open and there is communication between the outlet chamber 43 and the inlet chamber 41 while the final discharge port 48 is closed. When set as in Fig. 6, all the inlet ports are closed and the chamber 43 is in direct communication with the discharge port 48 so that there will be a rapid emptying of the cylinders.

The multiple cylinder arrangement is provided so as to obtain a uniform torque without undue pressure on any piston. When the driving shaft 5 stops, part of the oil held in suspension within the casing 80 will run over the lower edge of the opening 83 and into the outer or main casing 1, and when starting again, the hollow vanes 85 will pick up the oil from the chamber of the outer or main casing 1 and deliver it to the chamber formed by the inner casing 80, as previously explained.

Various changes might be made in the details of construction of my invention without departing from the spirit thereof or limiting its scope and hence I do not restrict myself to the precise details herein set forth.

Having fully described my invention what I claim as new and desire to secure by Letters-Patent, is:—

1. In hydraulic transmission mechanism, the combination with driving and driven shafts, of a cylinder eccentric to and rotatable with the driving shaft, said cylinder having two chambers, a rotor in each chamber, concentric with the axis of the driving shaft, said rotors being rotatable with the driven shaft, pistons carried by the respective rotors, the pistons of one rotor being disposed at an angle to the pistons of the other rotor, inlet and discharge ports for the cylinder chambers, and a controlling valve between the inlet and discharge ports whereby to transfer fluid from one side of the pistons to the other side thereof and control the rate of transfer.

2. In hydraulic transmission mechanism, the combination with driving and driven shafts, of a cylinder eccentric to and rotatable with the driving shaft, said cylinder having two chambers, a rotor in each chamber, concentric with the axis of the driving shaft, said rotors being rotatable with the driven shaft, pistons carried by the respective rotors, the pistons of one rotor being disposed at an angle to the pistons of the other rotor, inlet and discharge ports for the cylinder chambers, a transverse passage connecting the inlet ports, a transverse passage connecting the discharge ports, and a control valve between and having communication with the transverse passages.

3. In hydraulic transmission mechanism, the combination with driving and driven shafts, of a plurality of cylinders arranged eccentrically to and rotatable with said driving shaft, rotors in said cylinders and concentric to the driving shaft and rotatable with the driven shaft, pistons carried by the respective rotors, the pistons of one rotor being disposed at an angle to the pistons of the other rotor, a valve mechanism for each cylinder to control the passage of fluid to and from the same, and manually controlled operating means arranged between and common to the valve mechanisms.

4. In hydraulic transmission mechanism, the combination with driving and driven shafts, of a plurality of cylinders rotatable with the driving shaft and eccentric thereto, each cylinder having two chambers, rotors in the chambers of said cylinders and concentric to the axis of the driving shaft and rotatable with the driven shaft, pistons carried by each rotor, and manually controllable means for controlling the passage of liquid to and from said cylinder chambers and effecting transfer of the liquid from one side of the pistons to the other side thereof.

5. In hydraulic transmission mechanism, the combination with driving and driven shafts, of eccentrically disposed cylinders rigidly connected together, one of said cylinders being rigid with the driving shaft, a tubular shaft rigid with the other cylinder and enclosing the driven shaft, rotors in said cylinders and concentric to the axis of the driving and driven shafts and having rigid connection with the latter, pistons carried by said rotors, a valve mechanism carried by each cylinder for controlling the passage of fluid to and from said cylinders, each of said valve mechanisms including a control valve, arms movable on said tubular shaft, rods connected with said arms, operative connections between said rods and the control valves of said valve mechanisms, a hand lever, and connections between said hand lever and said arms.

6. In hydraulic transmission mechanism, the combination with driving and driven shafts, of eccentrically disposed cylinders rigidly connected together, one of said cylinders being rigid with the driving shaft, a tubular shaft rigid with the other cylinder and enclosing the driven shaft, rotors in said cylinders and concentric to the axis of the driving and driven shafts and having rigid connection with the latter, pistons carried by said rotors, a valve mechanism carried by each cylinder for controlling the passage of fluid to and from said cylinders, each of said valve mechanisms including a control valve, arms movable on said tubular shaft, rods connected with said arms, operative connections between said rods and the control valves of said valve mechanisms, a hand lever, and connections between said hand lever and said arms, said connections including a shifting arm having a bifurcated head, a guide for said arm and its head, a bifurcated arm movable with the hand lever and connections between said bifurcated arm and the bifurcated head on the shift arm.

7. In hydraulic transmission mechanism, the combination with a main casing and driving and driven shafts mounted therein, of a cylinder rotatable with the driving shaft and eccentric to the axis thereof, a rotor in said cylinder and concentric with the axis of said shaft, said rotor having rigid connection with the driven shaft, pistons carried by said rotor, an inner casing, valve mechanism for said cylinder and communicating with the chamber of said inner casing and with said cylinder, said valve mechanism including a manually operable control valve, said inner casing enclosing said cylinder and valve mechanism and rotatable with the same, and means operable to convey operating fluid from the chamber of the outer casing into the chamber of the inner casing during the rotation of the latter and the mechanism therein.

8. In hydraulic transmission mechanism, the combination with a main casing and driving and driven shafts mounted therein, of a cylinder rotatable with the driving shaft and eccentric to the axis thereof, a rotor in said cylinder and concentric with the axis of said shaft, said rotor having rigid connection with the driven shaft, pistons carried by said rotor, an inner casing, valve mechanism for said cylinder and communicating with the chamber of said inner casing and with said cylinder, said valve mechanism including a manually operable control valve, said inner casing enclosing said cylinder and valve mechanism and rotatable with the same, and means operable to convey operating fluid from the chamber of the outer casing into the chamber of the inner casing during the rotation of the latter and the mechanism therein, said means comprising a hollow vane carried by the inner casing and adapted to dip fluid from the chamber of the outer casing.

9. In hydraulic transmission mechanism, the combination with a main casing and driving and driven shafts mounted therein, of a cylinder rotatable with the driving shaft and eccentric to the axis thereof, a rotor in said cylinder and concentric with the axis of said shaft, said rotor having rigid connection with the driven shaft, pistons carried by said rotor, an inner casing, valve mechanism for said cylinder and communicating with the chamber of said inner casing and with said cylinder, said valve mechanism including a manually operable control valve, said inner casing enclosing said cylinder and valve mechanism and rotatable with the same, and means operable to convey operating fluid from the chamber of the outer casing into the chamber of the inner casing during the rotation of the latter and the mechanism therein, an end wall of the chamber within the inner casing having outlets.

10. In hydraulic transmission mechanism, the combination of driving and driven shafts, means for supporting the same, a cylinder rotatable with the driving shaft and eccentric to the axis thereof, a rotor in said cylinder and concentric with the axis of the driving shaft and rotatable with the driven shaft, pistons carried by said rotor, a casing enclosing said cylinder and rotatable therewith, means for discharging working fluid into said casing, and valve controlled means for conveying working fluid from the interior of said casing to said cylinder and from the same, the arrangement being such that the working fluid will be held in suspension within the chamber of said casing by centrifugal action and caused by such action to deliver pressure and to surround the valves and working parts.

11. In hydraulic transmission means, the combination with a driving shaft and a driven shaft, of a cylinder member rotatable with the driving shaft, a rotor member in the cylinder, the axis of one of said members being eccentric with respect to the axis of the other and the rotor member being rotatable with the driven shaft, a guide member movable through said rotor, pistons mounted in said guide member, means pressing said pistons in opposite directions, and means for controlling the passage of operating fluid to and from said cylinder and effecting transfer of the fluid from one side of the pistons to the other side thereof.

12. In hydraulic transmission mechanism, the combination with driving and driven shafts, of a plurality of connected cylinders rotatable with the driving shaft and eccentric to the axis thereof, a plurality of rotors in said cylinders, keys connecting said rotors, said connected rotors being rotatable with the driven shaft, pistons carried by said rotors, and valve mechanisms on the respective cylinders at opposite sides of the same for controlling the passage of fluid to and from said cylinders and effecting transfer of fluid from one side of the pistons to the other side thereof.

In testimony whereof, I have signed this specification,

CHARLES H. NORRLIN.